United States Patent [19]

Tanaka

[11] Patent Number: 5,780,096
[45] Date of Patent: Jul. 14, 1998

[54] PROCESS FOR PREPARATION OF POWDERY CHLORELLA EXTRACT

[76] Inventor: Yoshio Tanaka, 22 Banchi, Yamaguchi-cho, Gifu-shi, Gifu-ken, Japan

[21] Appl. No.: 712,469

[22] Filed: Sep. 11, 1996

[30] Foreign Application Priority Data

Dec. 25, 1995 [JP] Japan .................. 7-350030

[51] Int. Cl.$^6$ ............................................ A23L 1/28
[52] U.S. Cl. ..................... 426/655; 426/425; 426/473
[58] Field of Search ............................ 426/655, 650, 426/433, 425, 473

[56] References Cited

U.S. PATENT DOCUMENTS 4,143,162  3/1979  Tanaka ........................... 426/89
4,913,915  4/1990  Tanaka ........................... 426/72
4,915,961  4/1990  Tanaka ........................... 426/72
4,915,965  4/1990  Tanaka ........................... 426/282

FOREIGN PATENT DOCUMENTS 223655  4/1991  United Kingdom .

*Primary Examiner*—Anthony J. Weier
*Attorney, Agent, or Firm*—Browdy and Neimark

[57] ABSTRACT

A chlorella extract, which is useful as an additive for health food or pet food, is obtained by the steps of adding 1-10 parts by weight of a cyclodextrin solution to 100 parts by weight of an extract obtained by concentrating a hot water extract of a powdery chlorella alga by a factor of two to five, kneading the thus obtained mixture under reduced pressure at 60°-90° C. for 10-24 hours to give a cyclodextrin clatharte and then drying and powdering the clathrate.

4 Claims, No Drawings

PROCESS FOR PREPARATION OF POWDERY CHLORELLA EXTRACT

FIELD OF THE INVENTION

This invention relates to a process for preparation of a powdery chlorella extract, more particularly, to a method for powdering a concentrated hot water extract of a chlorella alga that contains substances for hastening the growth of an animal and other active ingredients.

BACKGROUND OF THE INVENTION

Various kinds of uses of chlorella algae in the production of food and feeds have been proposed so far. Japanese Patent Publication for Opposition (Kokoku) No. 7-22494 discloses a process comprising the steps of mixing a powder of a chlorella alga in an amount of 30 kg with water in an amount of 300 liters to form a water suspension, subjecting the water suspension to heat treatment at about 80°–100° C. for 15–20 minutes followed by filtration of the chlorella alga to obtain a hot water extract, concentrating the hot water extract to obtain a slurry-like extract which is 20 times as thick as the initial hot water extract, adding a cyclodextrin (hereinafter referred to as "CD") to the slurry-like extract followed by mixing and kneading to give a clathrate mixture, and drying and grinding the clathrate mixture to obtain a powdery mixture. However, the concentration of this powdery mixture was not sufficiently high for use in the preparation of food and feeds.

The present inventor conducted an intensive study for obtaining a chlorella extract powder containing water-soluble active ingredients of a hot water extract of a chlorella alga in higher concentration than a conventional chlorella extract powder. As a result, he has achieved the present invention.

SUMMARY OF THE INVENTION

This invention provides a process for preparation of a powdery chlorella extract comprising the steps of adding a CD solution to an extract obtained by concentrating a hot water extract of a powdery chlorella alga by a factor of two to five, kneading the thus obtained mixture at 60°–90° C. for 10–24 hours under reduced pressure to give a cyclodextrin clathrate and drying and powdering the clathrate.

In the present invention, the CD solution is preferably used in an amount of 1–10 parts by weight based on 100 parts by weight of the two- to five-fold concentrated extract of the powdery chlorella alga.

In one embodiment of the process according to the present invention, a powder of a chlorella alga in an amount of 10–50 kg is suspended in hot water of 85°–95° C. in a volume of 500–1000 liters for extraction treatment for 30–60 minutes. The residue of the suspension is filtered off and a hot water extract of the chlorella alga is obtained. The hot water extract is concentrated to a concentration of two- to five-fold the initial concentration. To 100 kg of the two- to five-fold concentrated extract is added 1–10 kg of a CD solution. The thus obtained mixture is kneaded at 60°–90° C. for 10–24 hours under the reduced pressure of 300–500 mmHg to afford a CD clathrate. The CD clathrate is subjected to drying treatment and then to grinding treatment.

When the present invention is carried out, if the extraction temperature the, namely, the temperature of hot water, is below 85° C., various active ingredients cannot sufficiently be extracted from the powdery chlorella alga. On the other hand, if the extraction temperature is above 95° C., such extraction is not economical although various active ingredients can be sufficiently extracted. If extraction time is less than 30 minutes, various active ingredients cannot be fully extracted. In contrast, if extraction time exceeds 60 minutes, the color of an extract solution deteriorates. Because the powdered chlorella alga will easily settle upon absorbing water, extraction treatment is preferably conducted with stirring to improve extraction efficiency.

A clathrate of the solid active ingredients present in a chlorella extract can be preferably formed by kneading a mixture of 100 parts by weight, for example, 100 kg of the chlorella extract and 1–10 parts by weight, for example, 1–10 kg of the CD solution at a temperature of 60°–90° C. for 10–24 hours under the reduced pressure of 300–500 mmHg. In other words, the solid active ingredients present in the two- to five-fold concentrated chlorella extract are sufficiently clathrated with 1–10 parts by weight of the CD solution by the clathration treatment under the atmospheric conditions of reduced pressure of 300–500 mmHg and a temperature of 60°–90° C. If the time for the clathration treatment is less than eight hours, only 80% or less of the solid active ingredients can be clathrated. If the time for the clathration treatment is more than 24 hours, such treatment is not economical although all of the solid active ingredients can be clathrated.

In the present invention, a CD solution is prepared by adding 1–40 parts by weight, for example, 1–40 kg of CD to 100 parts by weight, for example, 100 kg of water. The saturated CD solution at 90° C. contains CD in an amount of 40% of the total weight of the solution. A CD solution having at least 10% CD concentration is required for clathration of the chlorella extract.

Examples of CD include α-CD, β-CD, γ-CD and CD konaame (powdered candy of CD). Preferably β-CD is used in the present invention. The CD clathrate of the present invention is preferably dried by freeze-drying or heat-drying.

DETAILED DESCRIPTION OF THE INVENTION

EXAMPLE 1

A powdery chlorella alga in an amount of 30 kg was added to 700 liters of water. The mixture was heated to 90° C. and allowed to stand at that temperature for 50 minutes. It was then subjected to centrifugation to obtain a hot water extract which was concentrated by a factor of three to obtain 100 kg of a chlorella extract. The chlorella extract was put into a kneader and then 5 kg of a CD solution was also added to the kneader. These materials were kneaded for 15 hours at 70° C. under reduced pressure of 400 mmHg to afford a clathrate. The clathrate was dried by a film drier to obtain a dried clathrate. The dried clathrate was pulverized by a hammer mill to obtain a powdery chlorella extract.

In accordance with the present invention, a concentrated hot water extract of a chlorella alga has been obtained in the form of a powder. The concentrated hot water extract includes various useful ingredients such as amino acids, peptides, water-soluble proteins, polysaccharides, carbohydrates, minerals and nucleic acid-related substances. Thus, the concentrated hot water extract can be used as health food in the form of, for example, capsules, biscuits, crackers, beverages and so forth or as an additive for pet food having a form suitable for dogs, cats, goldfish, carp, birds and the other pets.

What is claimed is:

1. A process for preparing a powdery chlorella extract as a cyclodextrin clathrate comprising:

adding 1–10 kg of a cyclodextrin solution to 100 kg of an extract obtained by concentrating a hot water extract of a powdery chlorella alga by a factor of from two to five, thus concentrating the hot water extract to one half to one fifth of its original volume;

kneading the thus obtained mixture at 60°–90° C. for 10–24 hours under reduced pressure to produce a cyclodextrin clathrate; and drying and powdering the cyclodextrin clathrate.

2. A process according to claim 1, wherein the reduced pressure is 300–500 mmHg.

3. A process according to claim 1, wherein said cyclodextrin is β-cyclodextrin.

4. A process for preparing a cyclodextrin clathrate including a powdery chlorella extract comprising:

adding 1–10 parts by weight of a cyclodextrin solution to 100 parts by weight of an extract obtained by concentrating a hot water extract of a powdery chlorella alga by a factor of from two to five, thus concentrating the hot water extract to one half to one fifth of its original volume;

kneading the thus obtained mixture at 60°–90° C. for 10–24 hours under reduced pressure to produce a cyclodextrin clathrate; and drying and powdering the cyclodextrin clathrate.

* * * * *